US012665901B2

(12) United States Patent
Shionoiri

(10) Patent No.: US 12,665,901 B2
(45) Date of Patent: Jun. 23, 2026

(54) INFORMATION PROCESSING APPARATUS AND SERVICE PROVIDING SYSTEM

(71) Applicant: FUJIFILM Business Innovation Corp., Tokyo (JP)

(72) Inventor: Hirochika Shionoiri, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/298,377

(22) Filed: Apr. 11, 2023

(65) Prior Publication Data

US 2024/0163286 A1 May 16, 2024

(30) Foreign Application Priority Data

Nov. 11, 2022 (JP) ................................. 2022-181126

(51) Int. Cl.
 *H04L 29/00* (2006.01)
 *H04L 9/40* (2022.01)
(52) U.S. Cl.
 CPC .......... *H04L 63/0869* (2013.01); *H04L 63/02* (2013.01)
(58) Field of Classification Search
 CPC ...... H04L 63/0869; H04L 63/02; H04L 63/08
 See application file for complete search history.

(56) References Cited

U.S. PATENT DOCUMENTS 9,282,093 B2 3/2016 Luk et al.
9,756,040 B2 * 9/2017 Yoo ........................ H04L 9/0861

| | | | |
|---|---|---|---|
| 9,769,170 B2 | 9/2017 | Luk et al. | |
| 10,069,630 B2 | 9/2018 | Luk et al. | |
| 10,771,624 B1 * | 9/2020 | Penar | H04L 63/08 |
| 12,225,008 B1 * | 2/2025 | Yoon | H04L 63/08 |
| 2006/0075474 A1 * | 4/2006 | Takeuchi | G06F 21/41 726/5 |
| 2014/0053255 A1 * | 2/2014 | Lindteigen | H04L 63/02 726/8 |
| 2018/0130260 A1 * | 5/2018 | Schmirler | G06F 3/011 |
| 2018/0227277 A1 * | 8/2018 | Fischer | H04W 12/106 |
| 2019/0057204 A1 * | 2/2019 | Marcovecchio | H04L 67/146 |
| 2019/0236265 A1 * | 8/2019 | Juyal | G06F 21/445 |
| 2020/0288041 A1 * | 9/2020 | Miyata | H04N 1/4426 |
| 2020/0302070 A1 * | 9/2020 | Nakayama | G06F 3/1267 |
| 2020/0382442 A1 * | 12/2020 | Bantke | H04L 47/762 |
| 2021/0182370 A1 * | 6/2021 | Melnikov | H04W 12/065 |
| 2022/0050921 A1 * | 2/2022 | LaFever | G16H 10/60 |
| 2022/0070668 A1 * | 3/2022 | Henot | H04L 63/12 |
| 2022/0404790 A1 * | 12/2022 | Amaro, Jr. | H04L 43/20 |
| 2022/0404804 A1 * | 12/2022 | Amaro, Jr. | H04L 63/102 |

(Continued)

FOREIGN PATENT DOCUMENTS

JP 2016522932 8/2016

*Primary Examiner* — Don G Zhao
(74) *Attorney, Agent, or Firm* — JCIPRNET

(57) ABSTRACT

The information processing apparatus includes a processor configured to: acquire specified information that specifies a rule of first authentication information for each user used for authentication of the user, from a remote apparatus connected by a communication line via a firewall; and synchronize the first authentication information and second authentication information stored in the remote apparatus by transmitting the first authentication information compliant with the specified information among the first authentication information to the remote apparatus.

13 Claims, 10 Drawing Sheets

[AUTHENTICATION METHOD]
 · WITHOUT IDP AUTHENTICATION

[PASSWORD POLICY]
 · MINIMUM PASSWORD LENGTH: 8
 · CONFIGURING TEXT TYPE: COMBINATION OF NUMBERS AND ALPHABETS
 · EXPIRATION DATE: 3 MONTHS

~7(7A)

(56)     References Cited

U.S. PATENT DOCUMENTS

| 2023/0054446 | A1* | 2/2023 | LaFever | ................ | H04W 12/75 |
|---|---|---|---|---|---|
| 2023/0128173 | A1* | 4/2023 | Sha | ..................... | G06F 11/3628 |
| | | | | | 703/21 |
| 2023/0173395 | A1* | 6/2023 | Cella | .................... | G06N 3/0455 |
| | | | | | 463/25 |
| 2023/0315834 | A1* | 10/2023 | Patel | ....................... | G06F 21/31 |
| | | | | | 726/18 |
| 2023/0328104 | A1* | 10/2023 | Ghosh | ................... | H04W 4/021 |
| | | | | | 726/23 |
| 2024/0064006 | A1* | 2/2024 | Tie | ..................... | H04L 63/0892 |
| 2024/0163286 | A1* | 5/2024 | Shionoiri | ............... | H04L 63/02 |
| 2024/0169034 | A1* | 5/2024 | Yabushita | .............. | G06F 21/31 |

* cited by examiner

[AUTHENTICATION METHOD]
  · WITHOUT IDP AUTHENTICATION

[PASSWORD POLICY]
  · MINIMUM PASSWORD LENGTH: 8
  · CONFIGURING TEXT TYPE: COMBINATION OF NUMBERS AND ALPHABETS
  · EXPIRATION DATE: 3 MONTHS

| USER ID | USER NAME | PASSWORD | EMAIL ADDRESS | PASSWORD SETTING DATE |
|---------|-----------|----------|---------------|----------------------|
| U1 | USER A | psw1234A | a@test.com | 8/1/2022 |
| U2 | USER B | PassWord9B | b@test.com | 7/14/2022 |

| USER ID | USER NAME | PASSWORD | EMAIL ADDRESS | PASSWORD SETTING DATE |
|---------|-----------|----------|---------------|-----------------------|
| U1 | USER A | psw1234A | a@test.com | 8/1/2022 |
| U2 | USER B | psw9876B | b@test.com | 7/14/2022 |
| U3 | USER C | psw | c@test.com | 6/18/2022 |

| USER ID | USER NAME | PASSWORD | EMAIL ADDRESS | PASSWORD SETTING DATE | COOPERATION USER ID |
|---------|-----------|----------|---------------|----------------------|---------------------|
| U1 | USER A | psw1234A | a@test.com | 8/1/2022 | IDP-U1 |
| U2 | USER B | PassWord9B | b@test.com | 7/14/2022 | – |
| U3 | USER C | PW28userC | c@test.com | 6/18/2022 | IDP-U3 |

| USER ID | USER NAME | PASSWORD | EMAIL ADDRESS | PASSWORD SETTING DATE | COOPERATION USER ID |
|---------|-----------|----------|---------------|----------------------|---------------------|
| U1 | USER A | psw1234A | a@test.com | 8/1/2022 | IDP-U1 |
| U2 | USER B | psw9876B | b@test.com | 7/14/2022 | – |
| U3 | USER C | psw | c@test.com | 6/18/2022 | IDP-U3 |
| U4 | USER D | 1234 | d@test.com | 1/27/2022 | – |

[AUTHENTICATION METHOD]
　・WITHOUT IDP AUTHENTICATION

[PASSWORD POLICY]
　・MINIMUM PASSWORD LENGTH: 3
　・CONFIGURING TEXT TYPE: AT LEAST ONE OF NUMBERS OR ALPHABETS
　・EXPIRATION DATE: 6 MONTHS

~7(7B)

INFORMATION PROCESSING APPARATUS AND SERVICE PROVIDING SYSTEM

CROSS-REFERENCE TO RELATED APPLICATIONS

This application is based on and claims priority under 35 USC 119 from Japanese Patent Application No. 2022-181126 filed Nov. 11, 2022.

BACKGROUND

(i) Technical Field

The present disclosure relates to an information processing apparatus and a service providing system.

(ii) Related Art

JP2016-522932A discloses a method including a step of calculating a hash value based on a plain text password in association with a password change event in a source device, and a step of exporting data corresponding to the hash value to a target service in order to synchronize the data corresponding to the hash value with the target service.

SUMMARY

A method of constructing a virtual device (also referred to as "digital shadow") of a real device, which reflects the state of the real device by synchronizing with the attribute data of the real device on the cloud is known. In a case where the virtual device of a real device is used, the real device can be set by issuing an instruction to the virtual device through a communication line without going to the installation location of the real device.

However, the security level at the installation location of the real device and the security level on the cloud on which the virtual device is constructed are not necessarily the same. In this case, for example, in a case where the authentication policy corresponding to the security level on the cloud on which the virtual device is constructed is stricter than the authentication policy corresponding to the security level at the installation location of the real device, authentication information set in the looser authentication policy exists in an environment that does not comply with the stricter authentication policy, by simply synchronizing the authentication information held by the real device with the virtual device.

Aspects of non-limiting embodiments of the present disclosure relate to an information processing apparatus and a service providing system capable of preventing attribute data that does not match an authentication policy from being synchronized, in a situation where attribute data is synchronized between a virtual device and a real device, even in a case where the security levels are different in the authentication policy applied to the virtual device and the authentication policy applied to the real device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided the information processing apparatus including a processor configured to: acquire specified information that specifies a rule of first authentication information for each user used for authentication of the user, from a remote apparatus connected by a communication line via a firewall; and synchronize the first authentication information and second authentication information stored in the remote apparatus by transmitting the first authentication information compliant with the specified information among the first authentication information to the remote apparatus.

BRIEF DESCRIPTION OF THE DRAWINGS

Exemplary embodiment(s) of the present invention will be described in detail based on the following figures, wherein:

FIG. 4 is a diagram illustrating an example of remote user information;

FIG. 5 is a diagram showing an example of local user information;

FIG. 6 is a diagram showing an example of remote user information in a case where IDP authentication is used;

FIG. 7 is a diagram showing an example of local user information in a case where IDP authentication is used;

DETAILED DESCRIPTION

Hereinafter, an exemplary embodiment of the present disclosure will be described in detail with reference to the drawings. In addition, the identical components and the identical processes are denoted by the identical reference signs throughout the drawings, and redundant description will be omitted.

Figure 1:
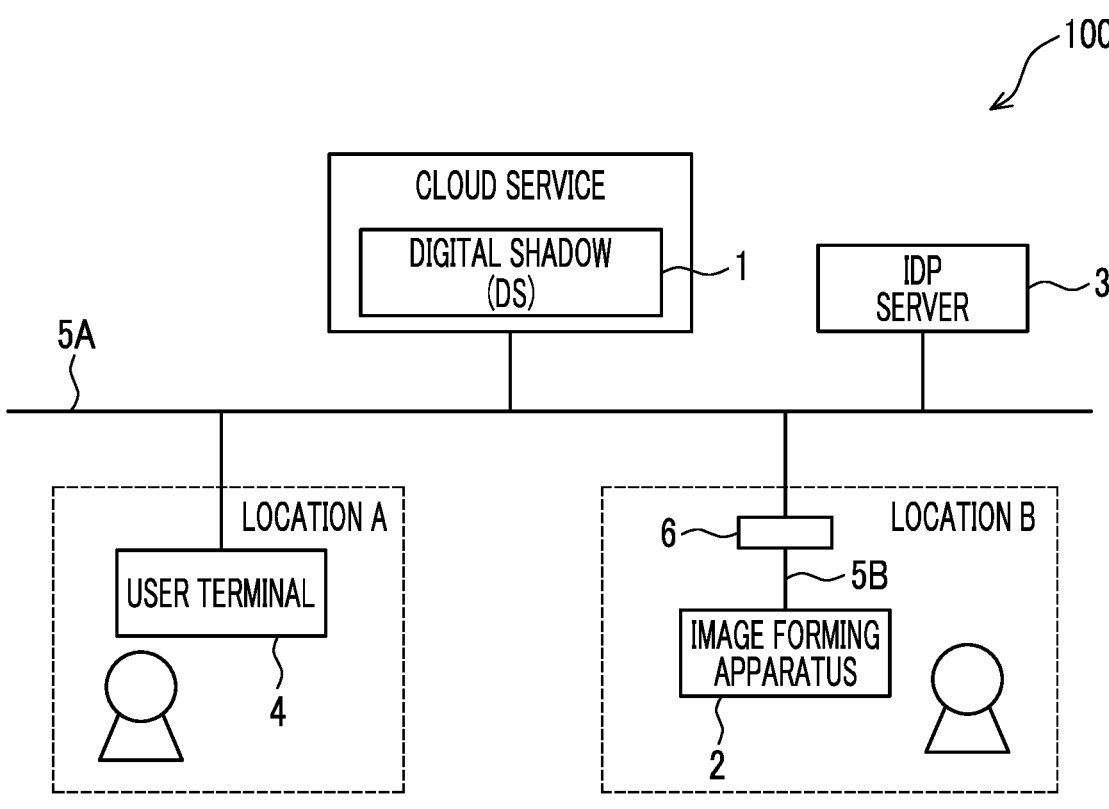
FIG. 1 is a diagram showing a system configuration example of a service providing system.

FIG. 1 is a diagram showing a system configuration example of a service providing system 100 according to an exemplary embodiment of the present disclosure. The service providing system 100 includes a digital shadow (hereinafter referred to as "DS") 1, an image forming apparatus 2, and an Identity Provider (IDP) server 3, and provides a user with a service using the image forming apparatus 2. The DS 1, the image forming apparatus 2, and the IDP server 3 are each connected to the Internet 5A. In addition to each apparatus included in the service providing system 100, for example, a user terminal 4 is connected to the Internet 5A.

The user terminal 4 is an information device located at a location A (for example, a base different from the location where the image forming apparatus 2 is installed) and is operated by a user who uses the service providing system 100. Specifically, the user terminal 4 is an information device having a data input/output function, a data processing function, and a communication function, such as a computer, a smartphone, a tablet terminal, and a wearable terminal. The user terminal 4 may be either a portable information device for which the using location changes, or a stationary information device for which the using location is fixed in advance.

The image forming apparatus 2 is an apparatus that performs a data process on an image in response to an instruction of a user. Examples of the data process on an image include a scan function of reading the contents described on a recording medium such as paper as image data, a copy function of reproducing the contents of the image data of paper acquired by the scan function as an image on a recording medium as it is, and a print function of forming image data designated in advance by the user as an image on a paper medium.

The image forming apparatus 2 stores attribute data regarding various functions included in the image forming apparatus 2. The attribute data is a collection of attributes representing the state of the image forming apparatus 2 or the operation of the image forming apparatus 2.

The image forming apparatus 2 is installed in a remote location (for example, a workplace: represented as "location B" in the example of FIG. 1) different from a location A where the user operates the user terminal 4.

Therefore, in a case where a user in the location B (hereinafter, referred to as a "local user") uses the service using the image forming apparatus 2, the local user touches and operates the operation panel of the image forming apparatus 2 to give an instruction to the image forming apparatus 2, but in a case where a user at the location A (hereinafter, referred to as a "remote user") uses the service using the image forming apparatus 2, it is not practical for the remote user to move to the location B and operate the image forming apparatus 2.

Therefore, the DS 1 is provided on the Internet 5A which is an example of a network such that a remote user can use the service using the image forming apparatus 2 from the location A. Hereinafter, the remote user and the local user may be collectively referred to as a "user".

The DS 1 is, for example, a server constructed by using a cloud service provided on the Internet 5A, is connected to the user terminal 4 via the Internet 5A, and is connected to the image forming apparatus 2 via the firewall 6.

Such a DS 1 has state information of the image forming apparatus 2, setting values defining the apparatus configuration of the image forming apparatus 2 and the operation of the image forming apparatus 2, and metadata having attribute data included in the image forming apparatus 2, such as user information including user identification information and password for performing user authentication in the image forming apparatus 2. The metadata is a data set including attribute data of the image forming apparatus 2. The attribute data is updated between the DS 1 and the image forming apparatus 2 such that each attribute of the image forming apparatus 2 included in the DS 1 and each attribute included in the image forming apparatus 2 represent the same attribute value.

That is, the DS 1 stores, as metadata, the same attribute data as the attribute data of the image forming apparatus 2 installed at the location B. Therefore, the remote user can virtually operate the image forming apparatus 2 installed at the location B by operating the DS 1 from the user terminal 4. That is, the DS 1 is an example of a virtual device, and the image forming apparatus 2 is an example of a real device.

In addition, updating the attribute values such that the attribute values of the attributes possessed by the DS 1 and the image forming apparatus 2 are the same is referred to as "synchronization".

The IDP server 3 is an authentication apparatus that enables a plurality of services constructed by using a cloud service, such as the DS 1, to be logged in from the user terminal 4 by using common authentication information, and is a service apparatus generally called an ID provider. That is, the IDP server 3 centrally manages user information used for logging in a plurality of services, and achieves a reduction in a burden of management work in each service and a countermeasure for information leakage. User authentication using the IDP server 3 is referred to as "IDP authentication". In the service providing system 100, the IDP server 3 may not be included. For example, the IDP server 3 is used in a case where user information common to other services is used for user authentication in the DS 1.

Further, in order to prevent the image forming apparatus 2 from receiving unauthorized access from the Internet 5A, the firewall 6 is provided in the location B such that data other than a response to a request transmitted from the image forming apparatus 2 is not received from the Internet 5A. Therefore, the image forming apparatus 2 is temporarily connected to the Local Area Network (LAN) 5B installed at the location B, and then is connected to the Internet 5A via the firewall 6.

As described above, although the image forming apparatus 2 is connected to the Internet 5A via the firewall 6 in FIG. 1, the image forming apparatus 2 may be directly connected to the Internet 5A without providing the firewall 6.

For convenience of description, a location where the image forming apparatus 2 connected to the LAN 5B with the firewall 6 as a boundary is installed is referred to as "inside the firewall 6". Further, locations where the DS 1, the IDP server 3, and the user terminal 4 connected to the Internet 5A with the firewall 6 as a boundary are installed is referred to as "outside the firewall 6". The image forming apparatus 2 is an example of a local apparatus installed inside the firewall 6, and the DS 1 is an example of a remote apparatus installed outside the firewall 6. Further, the IDP server 3 is an example of an authentication apparatus installed outside the firewall 6.

The DS 1 may be accessed from a user terminal 4 or external terminals (not shown) other than the user terminal 4 connected to the Internet 5A. Such a user terminal 4 and external terminals include a terminal that attempts to illegally acquire the user information possessed by the DS 1. On the other hand, the image forming apparatus 2 is blocked from unauthorized access from the Internet 5A by the firewall 6. Therefore, the authentication policy that specifies the setting content of the user information registered by the user in order to use the DS 1 or the image forming apparatus 2 may be stricter in the DS 1 than in the image forming apparatus 2. That is, in a case where there is a user who logs in to both the DS 1 and the image forming apparatus 2, the user information used by the user to log in to the DS 1 as a remote user and the user information used to log in to the image forming apparatus 2 as a local user may differ. Therefore, in a case of synchronizing the user information which is an example of the attribute data between the DS 1 and the image forming apparatus 2, it is desired that the DS 1 and the image forming apparatus 2 synchronize the user information while paying attention to the difference in the authentication policies of the DS 1 and the image forming apparatus 2 and exclude user information that does not match the authentication policy from the synchronization targets.

Figures 2, 3:
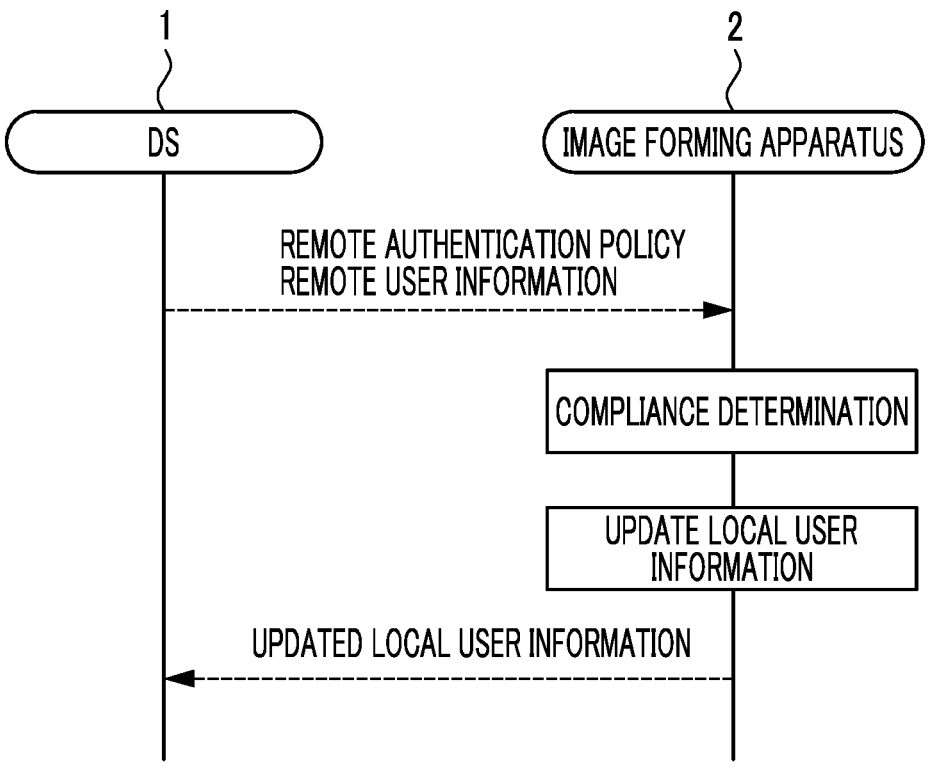
FIG. 2 is a sequence diagram illustrating a flow of a synchronization process of user information performed by an image forming apparatus.
FIG. 3 is a diagram showing an example of a remote authentication policy.

FIG. 2 is a sequence diagram illustrating a flow of a synchronization process of user information performed by the image forming apparatus 2. For convenience of description, hereinafter, the authentication policy of the DS 1 will be referred to as a "remote authentication policy 7A", and the authentication policy of the image forming apparatus 2 will be referred to as a "local authentication policy 7B". Further, the remote authentication policy 7A and the local authentication policy 7B are collectively referred to as "authentication policy 7". Further, the user information used for authenticating the remote user who has made the connection request to the DS 1 is represented as "remote user information 8A", and the user information used for authenticating the local user who has made the function execution request to the image forming apparatus 2 is represented as "local user information 8B". Further, the remote user information 8A and the local user information 8B are collectively referred to as "user information 8".

In addition, the local user information 8B is an example of the first authentication information, and the remote user information 8A is an example of the second authentication information. Further, the remote authentication policy 7A is an example of the specified information.

As shown in FIG. 2, the image forming apparatus 2 acquires the remote authentication policy 7A and the remote user information 8A from the DS 1.

FIG. 3 is a diagram showing an example of the remote authentication policy 7A. The remote authentication policy 7A includes, for example, [Authentication Method] and [Password Policy].

In [Authentication Method], information indicating whether or not to perform IDP authentication, that is, authentication using the IDP server 3 for user authentication of the remote user is set.

A rule regarding the password of the remote user used in the DS 1 is set in [Password Policy]. Specifically, in [Password Policy], for example, a minimum password length that specifies the minimum number of texts in a password, a configuring text type that specifies the type of texts configuring the password, and an expiration date that specifies the expiration date when the set password is available are set. As the minimum password length becomes longer and the type of texts configuring the password increases, the password becomes more complicated. Therefore, the minimum password length and the configuring text type are also information that specifies the complexity of the password.

In the example of the remote authentication policy 7A shown in FIG. 3, it is specified that IDP authentication is not used for user authentication of the remote user, the minimum password length of the password included in the remote user information 8A is 8 texts, the configuring text type of the password is a combination of numbers and alphabets, and the expiration date of the password is 3 months. The remote authentication policy 7A may be defined for each DS 1, or a common remote authentication policy 7A may be defined for a plurality of DSs 1.

FIG. 4 is a diagram showing an example of the remote user information 8A. The remote user information 8A includes, for example, items of a user ID, a user name, a password, an email address, and a password setting date.

The user ID is identification information for uniquely identifying each user, and is assigned to a user by, for example, the service providing system 100 in a case where the user registers his or her own information in the service providing system 100. In addition, although user IDs are assigned to both remote users and local users, there is also a user who operates from the image forming apparatus 2 as a local user, among remote users, so that in a case where the remote user and the local user are the same user, the same user ID is assigned to the users.

The user name is information indicating who the user is, and is information set by the user.

The password is information for determining whether or not the user who is trying to log in is the user represented by the user name, and is information set by the user.

The email address is information representing contact details of the user and is set by the user. In a case where an event of which the user is to be notified occurs in the service providing system 100, a message is transmitted to the email address.

The password setting date is a date on which the password is set by the user, and is set by the service providing system 100.

The image forming apparatus 2 executes a compliance determination for determining whether or not each piece of the local user information 8B included in the image forming apparatus 2 complies with the acquired remote authentication policy 7A. A fact that the local user information 8B complies with the remote authentication policy 7A means a situation in which the password included in the local user information 8B satisfies each condition of the [Password Policy] specified in the remote authentication policy 7A.

FIG. 5 is a diagram showing an example of the local user information 8B. The local user information 8B also includes the same items as the remote user information 8A illustrated in FIG. 4. As already described, since the remote authentication policy 7A and the local authentication policy 7B may be different, different passwords may be set even in the remote user information 8A and the local user information 8B representing the same user. In the case of the example of FIG. 5, since the user C whose user ID is represented by "U3" has the text string of the password that does not satisfy the [Password Policy] conditions of the remote authentication policy 7A shown in FIG. 3, the local user information 8B whose user ID is represented by "U3" is excluded from the synchronization targets and is stored only in the image forming apparatus 2.

The image forming apparatus 2 transmits, to the DS 1, the local user information 8B that complies with the remote authentication policy 7A, among the local user information 8B included in the image forming apparatus 2, for synchronization with the DS 1. Accordingly, the user information 8 is synchronized between the DS 1 and the image forming apparatus 2.

The image forming apparatus 2 does not transmit, to the DS 1, the local user information 8B that does not comply with the remote authentication policy 7A, among the local user information 8B included in the image forming apparatus 2. Accordingly, the local user information 8B that does not comply with the remote authentication policy 7A is excluded from the synchronization of the user information 8 performed between the DS 1 and the image forming apparatus 2. In addition, in a case where, among the local user information 8B included in the image forming apparatus 2, information corresponding to the local user information 8B that does not comply with the remote authentication policy 7A exists in the remote user information 8A of the DS 1, and the image forming apparatus 2 performs synchronization, the information corresponding to the local user information 8B may be deleted from the remote user information 8A.

In addition, although FIG. 4 and FIG. 5 show examples of the remote user information 8A and the local user information 8B in a case where the service providing system 100 does not use IDP authentication, in a case where IDP authentication is used, information related to IDP authentication is added to the remote user information 8A and the local user information 8B.

FIG. 6 is a diagram showing an example of remote user information 8A in a case where the service providing system 100 uses IDP authentication, and FIG. 7 is a diagram showing an example of local user information 8B in a case where the service providing system 100 uses IDP authentication.

The remote user information 8A and the local user information 8B shown in FIGS. 6 and 7 are different from the remote user information 8A and the local user information 8B shown in FIGS. 4 and 5 in that a "cooperation user ID" is added.

The "cooperation user ID" is a user ID obtained by registration in the IDP server 3, and is user identification information assigned by the IDP server 3. The user registers the cooperation user ID, which has been assigned by the IDP server 3 in a case where the user information is registered in the IDP server 3, in the service providing system 100 at the time of registration in the service providing system 100. The cooperation user ID is an example of the third authentication information.

"-" in the cooperation user IDs of FIGS. 6 and 7 indicates that the user associated with the user information 8 for which "-" is set in the cooperation user ID is the user that does not use the service providing system 100 using IDP authentication. In the case of the example of the remote user information 8A shown in FIG. 6, the user B whose user ID is represented by "U2" represents a user who does not perform IDP authentication. Further, in the case of the example of the local user information 8B shown in FIG. 7, the user B and the user D whose user IDs are represented by "U2" and "U4", respectively, represent users who do not perform IDP authentication.

In addition, the items included in the user information 8 are not limited to the items shown in FIGS. 4 to 7. For example, the user information 8 may include an affiliation group to which the user belongs, such as the "general affairs department" and the "sales department", and the position of the user.

Figure 8:
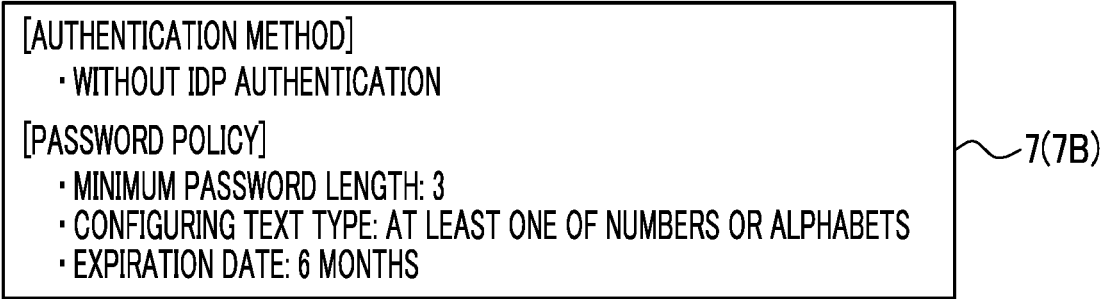
FIG. 8 is a diagram showing an example of a local authentication policy.

FIG. 8 is a diagram showing an example of the local authentication policy 7B. Similar to the remote authentication policy 7A, the local authentication policy 7B also includes, for example, an [Authentication Method] and a [Password Policy].

In addition, the content of the authentication policy 7 is not limited to the content shown in FIG. 3 and FIG. 8. For example, as a [Password Policy], for example, a specification may be provided such that reuse of a password used in the past is not permitted. Further, the rules to be set may be different between the remote authentication policy 7A and the local authentication policy 7B. Specifically, the remote authentication policy 7A may be provided with a rule for setting the expiration date of the password, but the local authentication policy 7B may not be provided with the rule for setting the expiration date of the password. Further, any one authentication policy 7 among the plurality of authentication policies 7 may be applied depending on the user. For example, in a case where the position of the user is a manager position, the authentication policy 7 in which the

[Password Policy] having a stricter content than the authentication policy 7 applied to the general position is set may be applied.

The DS 1 executes a compliance determination for determining whether or not each of the remote user information 8A included in the DS 1 complies with the acquired local authentication policy 7B.

The DS 1 updates the remote user information 8A that complies with the local authentication policy 7B, among the remote user information 8A, with the local user information 8B of the user associated with the remote user information 8A.

In addition, the firewall 6 restricts access from the outside of the firewall 6 to the inside of the firewall 6. Therefore, in a case where the firewall 6 is provided at the location B in FIG. 1, the DS 1 receives, for example, the local authentication policy 7B and the local user information 8B transmitted at predetermined intervals by the image forming apparatus 2 to acquire the local authentication policy 7B and the local user information 8B. Further, the DS 1 transmits the remote authentication policy 7A and the remote user information 8A to the image forming apparatus 2 as a response to the polling from the image forming apparatus 2.

Figure 9:
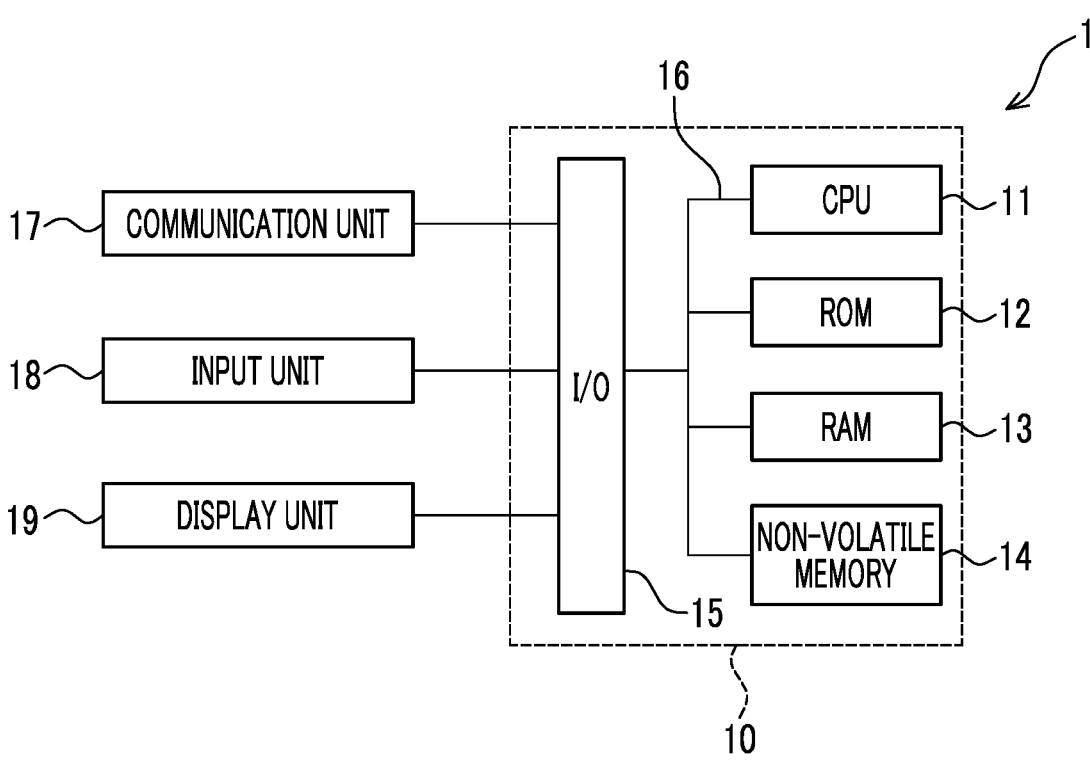
FIG. 9 is a diagram showing a configuration example of a main part of an electrical system of a DS configured by using a computer.

The DS 1 and the image forming apparatus 2 that perform such synchronization process can be configured by using the computer 10 and the computer 20, respectively. FIG. 9 is a diagram illustrating a configuration example of a main part of the electrical system of the DS 1 configured by using the computer 10.

The computer 10 includes a Central Processing Unit (CPU) 11 which is an example of a second processor that executes the process in the DS 1, a Read Only Memory (ROM) 12 that stores a startup program (Basic Input Output System: BIOS) that performs the startup process of the computer 10, a Random Access Memory (RAM) 13 used as a temporary work area of the CPU 11, a non-volatile memory 14, and an input/output interface (I/O) 15. The CPU 11, the ROM 12, the RAM 13, the non-volatile memory 14, and the I/O 15 are connected to each other via a bus 16.

The non-volatile memory 14 is an example of a storage device that retains stored information even in a case where power supplied to the non-volatile memory 14 is cut off, and for example, a semiconductor memory is used, but a hard disk may be used.

For example, a communication unit 17, an input unit 18, and a display unit 19 are connected to the I/O 15.

The communication unit 17 is connected to the Internet 5A and includes a communication protocol for performing data communication with each apparatus connected to the Internet 5A.

The input unit 18 is an example of a unit that receives a user's operation on the DS 1 and notifies the CPU 11 of the operation, and includes, for example, a button, a touch panel, a keyboard, a mouse, a pointing device, and the like.

The display unit 19 is an example of a unit that visually displays information processed by the CPU 11, and includes, for example, a liquid crystal display, an organic electro luminescence (EL) display, or the like.

Figure 10:
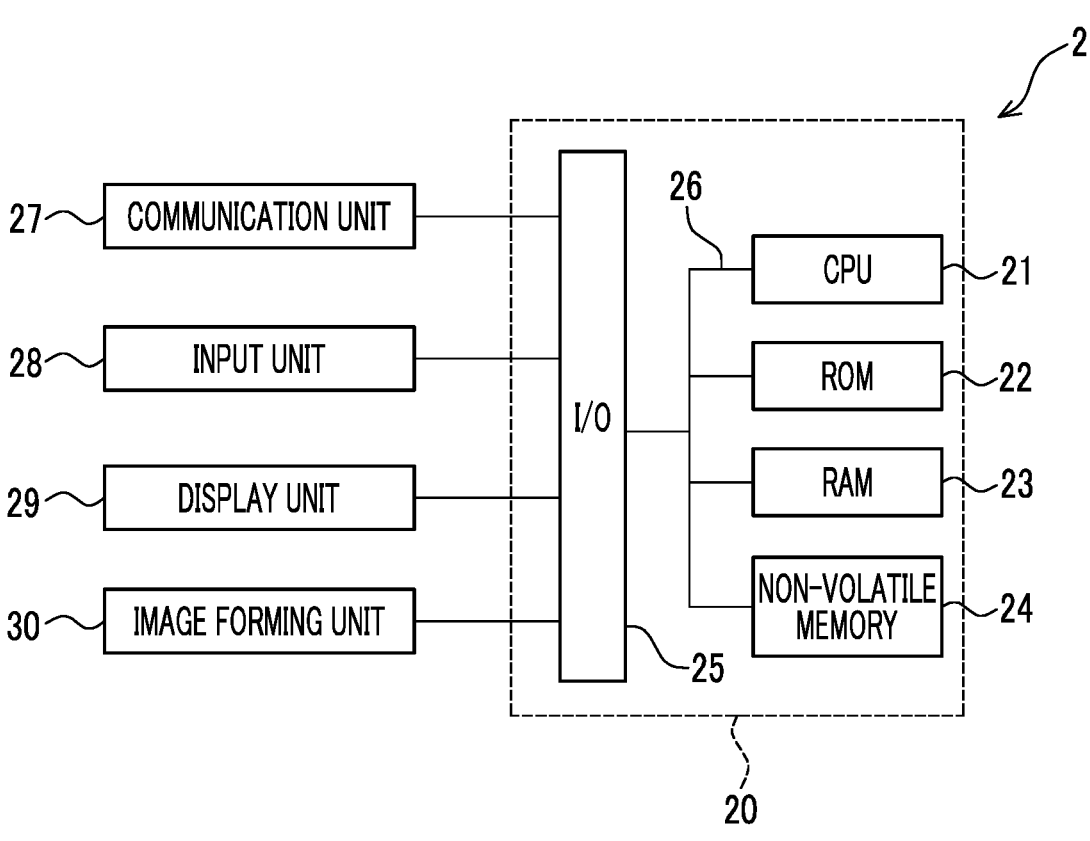
FIG. 10 is a diagram showing a configuration example of a main part of an electrical system of an image forming apparatus configured by using a computer.

On the other hand, FIG. 10 is a diagram showing a configuration example of a main part of an electrical system of an image forming apparatus 2 configured by using the computer 20.

The computer 20 includes a CPU 21 which is an example of a first processor that executes the process in the image forming apparatus 2, a ROM 22 that stores the BIOS that performs the startup process of the computer 20, a RAM 23 used as a temporary work area of the CPU 21, a non-volatile memory 24, and an I/O 25. The CPU 21, the ROM 22, the RAM 23, the non-volatile memory 24, and the I/O 25 are connected to each other via a bus 26.

Further, a communication unit 27, an input unit 28, a display unit 29, and an image forming unit 30 are connected to the I/O 25.

The communication unit 27 is connected to the LAN 5B and includes a communication protocol for performing data communication with the image forming apparatus 2 and the IDP server 3 via the firewall 6.

The input unit 28 is an example of a unit that receives a user's operation on the image forming apparatus 2 and notifies the CPU 21 of the operation, and includes, for example, a button, a touch panel, a pointing device, and the like.

The display unit 29 is an example of a unit that visually displays information processed by the CPU 21, and includes, for example, a liquid crystal display and an organic EL display.

The image forming unit 30 is a unit that forms an image according to the type of the instructed image forming function. The image forming unit 30 includes, for example, a scanner unit that optically reads the contents of a document to generate an image of the document, and a printing unit that prints an image represented by image data on a recording medium using a color material such as toner or ink.

Next, the operation of the synchronization process of the user information 8 executed by the service providing system 100 will be described. Hereinafter, the synchronization process of the user information 8 executed by the service providing system 100 will be described using a processing example in the image forming apparatus 2.

Figure 11:
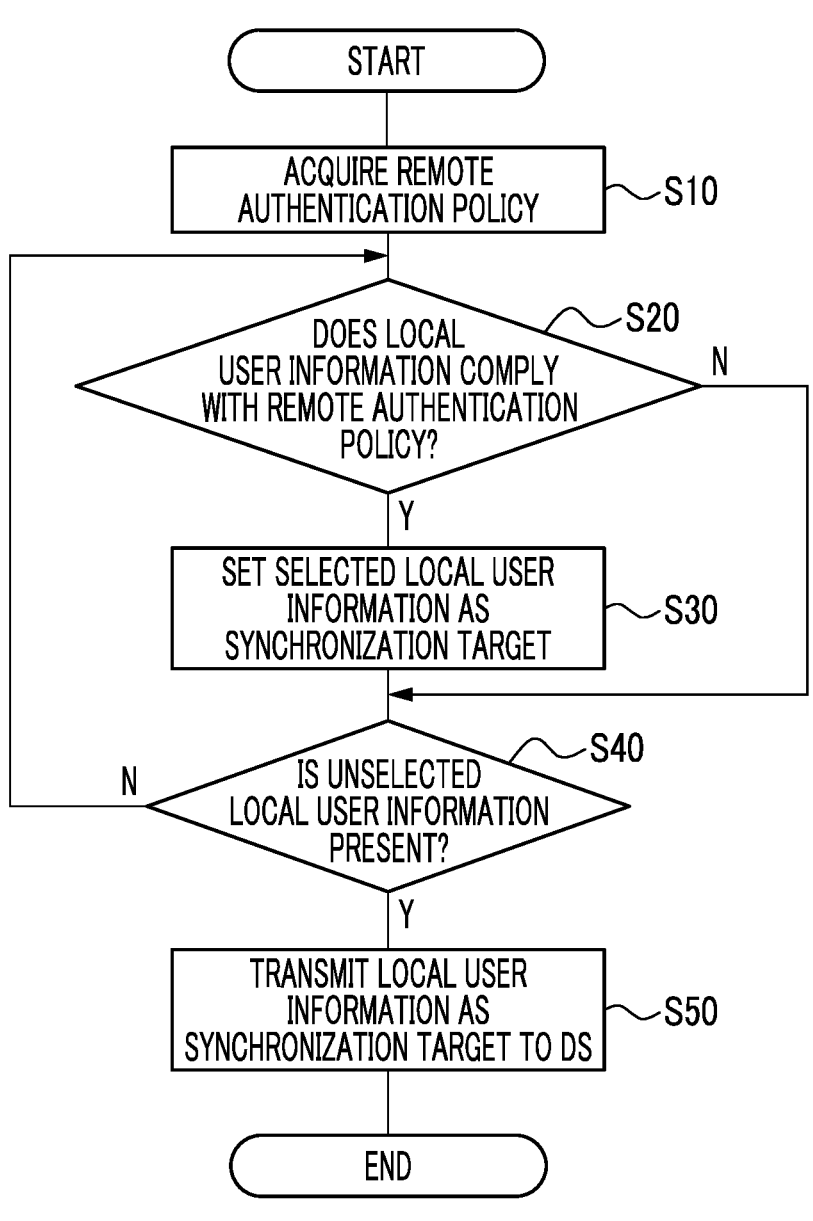
FIG. 11 is a flowchart showing an example of a flow of a user information synchronization process.

FIG. 11 is a flowchart showing an example of a flow of a synchronization process of the user information 8 executed by the CPU 21 of the image forming apparatus 2 in a case where the remote authentication policy 7A and the remote user information 8A are acquired from the DS 1.

The local program that specifies the synchronization process of the user information 8 is stored in advance, for example, in the non-volatile memory 24 of the image forming apparatus 2. The CPU 21 of the image forming apparatus 2 reads the local program stored in the non-volatile memory 24 and executes the synchronization process of the user information 8.

Here, as an example, the operation of the synchronization process of the user information 8 will be described using an example in which the image forming apparatus 2 acquires the remote authentication policy 7A shown in FIG. 3 and the remote user information 8A shown in FIG. 4 from the DS 1. That is, it is assumed that the service providing system 100 does not support IDP authentication linked with the IDP server 3. Further, as an example, it is assumed that the local user information 8B shown in FIG. 5 is stored in advance in the non-volatile memory 24.

In step S10, the remote authentication policy 7A is acquired from the DS 1, and the CPU 21 stores the remote authentication policy 7A in the RAM 23.

In step S20, the CPU 21 reads out the local user information 8B stored in the non-volatile memory 24, and determines whether or not each local user information 8B complies with the remote authentication policy 7A acquired in step S10.

The password in the local user information 8B of the user A and the user B shown in FIG. 5 is a password which has a password length of 8 texts and in which numbers and alphabets are combined. Further, assuming that the date on which the compliance determination of the local user information 8B is performed is Aug. 10, 2022, each password is set to be within three months. Therefore, the local user information 8B of the user A and the user B shown in FIG. 5 complies with the acquired remote authentication policy 7A.

On the other hand, the password in the local user information 8B of the user C shown in FIG. 5 does not comply with the acquired remote authentication policy 7A because the password length is three texts.

In a case where the local user information 8B selected in step S20 complies with the remote authentication policy 7A, the process proceeds to step S30.

In step S30, the CPU 21 sets the local user information 8B selected in step S20 as a target to be synchronized with the remote user information 8A, and proceeds to step S40.

On the other hand, in the determination process of step S20, in a case where the local user information 8B selected in step S20 does not comply with the remote authentication policy 7A, the local user information 8B is not set as the synchronization target, and the process proceeds to step S40.

In step S40, the CPU 21 determines whether or not the unselected local user information 8B that has not yet been selected in step S20 is present in the local user information 8B stored in the non-volatile memory 24. In a case where the unselected local user information 8B is present, the process proceeds to step S20, and until all pieces of the local user information 8B stored in the non-volatile memory 24 are determined, the processes of steps S20 to S40 are repeatedly executed for each piece of selected local user information 8B.

Accordingly, in the case of the local user information 8B shown in FIG. 5, the local user information 8B of the user A and the user B is set as the target to be synchronized with the remote user information 8A of the DS 1, and the local user information 8B of the user C is excluded from the targets to be synchronized with the remote user information 8A of the DS 1.

In step S50, the CPU 21 controls the communication unit 27 to transmit, to the DS 1, only the acquired data compliant with the remote authentication policy 7A, among the local user information 8B determined in step S20, and ends the synchronization process of the user information 8 shown in FIG. 11. Accordingly, in the case of the local user information 8B shown in FIG. 5, the local user information 8B of the user A and the user B is transmitted to the DS 1 and the synchronization process is performed. However, the local user information 8B of the user C does not comply with the remote authentication policy 7A and is not transmitted to the DS 1. Alternatively, in a case where the synchronization process in the DS 1 is performed, and the information of the user C is present in the remote user information 8A, the information of the user C is deleted.

Other Determination Examples of Local User Information to be Updated

In the above description, an example of synchronizing the local user information 8B compliant with the remote authentication policy 7A acquired from the DS 1 with the DS 1 has been described. However, the determination method of the local user information 8B set as a synchronization target is not limited to this.

For example, even in a case where the local user information 8B does not comply with the remote authentication policy 7A, as long as the local user information 8B satisfies a predetermined specific condition, the CPU 21 may synchronize the local user information 8B that does not comply with the remote authentication policy 7A.

As the specific condition, for example, a condition that the local user information 8B is associated with information related to IDP authentication (for example, a cooperation user ID) issued by the IDP server 3 installed outside the firewall 6 is used.

This is because the fact that the cooperation user ID is associated with the local user information 8B means that the user associated with the local user information 8B is considered to be a user who performs IDP authentication and uses the service providing system 100. Therefore, even in a case where the local user information 8B of such a user is synchronized with the DS 1, there is no change in the time and effort required for the user to authenticate the user, and the reliability of the user authentication is guaranteed by the authentication policy of the IDP server 3.

The synchronization process of the user information 8 in consideration of the specific condition will be described with reference to the remote user information 8A shown in FIG. 6 and the local user information 8B shown in FIG. 7, based on the synchronization process of the user information 8 shown in FIG. 11. As can be seen from the fact that the remote user information 8A illustrated in FIG. 6 and the local user information 8B illustrated in FIG. 7 each include an item of the cooperation user ID, it is assumed that the service providing system 100 in the description corresponds to IDP authentication linked with the IDP server 3.

In a case where it is determined in step S20 of FIG. 11 that the selected local user information 8B does not comply with the remote authentication policy 7A, the CPU 21 determines whether or not the cooperation user ID is set in the selected local user information 8B.

In a case where the cooperation user ID is set in the selected local user information 8B, the process proceeds to step S30, and in step S30, the CPU 21 sets the selected local user information 8B as a target to be synchronized with the remote user information 8A.

On the other hand, in a case where the cooperation user ID is not set in the selected local user information 8B, the process may proceed to step S40 without executing the process of step S30.

For other processes, the same process as the synchronization process of the user information 8 shown in FIG. 11 is performed, the description thereof will be omitted.

Assuming that the date on which the compliance determination of the local user information 8B is performed is Aug. 10, 2022, the local user information 8B of the user A shown in FIG. 7 complies with the remote authentication policy 7A shown in FIG. 3, so that the local user information 8B is to be synchronized with the remote user information 8A of the user A shown in FIG. 6, regardless of whether or not the cooperation user ID is set.

Since the local user information 8B of the user B shown in FIG. 7 also complies with the remote authentication policy 7A shown in FIG. 3, the local user information 8B is a target to be synchronized with the remote user information 8A of the user B shown in FIG. 6, regardless of whether or not the cooperation user ID is set.

Since the local user information 8B of the user C shown in FIG. 7 does not have enough minimum password length, the local user information 8B also does not comply with the remote authentication policy 7A shown in FIG. 3. However, since the cooperation user ID is set in the local user information 8B of the user C, the local user information 8B of the user C is a target to be synchronized with the remote user information 8A of the user C shown in FIG. 6.

Since the local user information 8B of the user D shown in FIG. 7 also does not have enough minimum password length, the local user information 8B also does not comply with the remote authentication policy 7A shown in FIG. 3. Moreover, since the cooperation user ID is not set in the local user information 8B of the user D, the local user information 8B of the user D is not a target to be synchronized with the remote user information 8A.

Even in a case where the local user information 8B does not comply with the remote authentication policy 7A, the specific condition for synchronizing the local user information 8B with the remote user information 8A is not limited to the presence or absence of the association of information related to IDP authentication in the local user information 8B.

For example, as the specific condition, a condition related to the user associated with the local user information 8B may be used. Specifically, in a case where the user associated with the local user information 8B belongs to a specific affiliation destination (for example, the general affairs department) or has a specific position (for example, a department manager), even in a case where the local user information 8B does not comply with the remote authentication policy 7A, the local user information 8B may be a target to be synchronized with the remote user information 8A.

In addition, the CPU 21 refers to, for example, a usage history of the function provided by the image forming apparatus 2 stored in the non-volatile memory 24, and in a case where the frequency of use of the function provided by the image forming apparatus 2 is a predetermined number of times (for example, once a day) or more, even in a case where the local user information 8B does not comply with the remote authentication policy 7A, the local user information 8B may be a target to be synchronized with the remote user information 8A.

On the contrary, even in a case where the local user information 8B complies with the remote authentication policy 7A, a specific condition may be defined such that the local user information 8B is not synchronized with the remote user information 8A. For example, in a case where the user associated with the local user information 8B satisfies the condition regarding the user described above, even in a case where the local user information 8B of the user complies with the remote authentication policy 7A, the local user information 8B is not a target to be synchronized with the remote user information 8A.

As described above, a specific condition for setting the local user information 8B as a target to be synchronized with the remote user information 8A even in a case where the local user information 8B does not comply with the remote authentication policy 7A, or a specific condition for not setting the local user information 8B as a target to be synchronized with the remote user information 8A even in a case where the local user information 8B complies with the remote authentication policy 7A may be defined using at least one of a predetermined condition regarding the affiliation destination of the user, a predetermined condition regarding the position of the user, or a predetermined condition regarding the frequency of use of functions provided by the image forming apparatus 2.

In addition, in step S50 of FIG. 11, the CPU 21 transmits, to the DS 1, the local user information 8B that is the target for synchronization in step S30, but may also transmit, to the DS 1, a deletion request including the local user information 8B that is not target for synchronization.

In a case where the remote user information 8A having the same password as the password of the local user information 8B included in the deletion request is present, the DS 1 deletes the remote user information 8A from the DS 1.

In the DS 1 connected to the Internet 5A, the remote user information 8A that does not comply with the remote authentication policy 7A is more likely to receive unauthorized access than the remote user information 8A that complies with the remote authentication policy 7A.

Therefore, since the image forming apparatus 2 transmits the deletion request to the DS 1, for example, in the synchronization process of the user information 8, even in a case where a situation occurs in which the remote user information 8A of the DS 1 is synchronized with the local user information 8B that does not comply with the remote authentication policy 7A, the remote user information 8A is deleted from the DS 1, and only the remote user information 8A compliant with the remote authentication policy 7A is registered in the DS 1.

Further, the image forming apparatus 2 may acquire the security warning from the DS 1 together with or separately from the remote authentication policy 7A and the remote user information 8A. The security warning is information for notifying the image forming apparatus 2 that a predetermined event has occurred in the DS 1 as an event to be noted, and is generated by the DS 1. The events to be noted include, for example, events that are considered to be unauthorized access, events that are considered to be preparations for performing unauthorized access, and events that are likely to cause unauthorized access. Specifically, in a case where the number of times that a specific remote user fails in user authentication consecutively becomes equal to or more than a predetermined number of times, or in a case where the number of times that a specific remote user continuously fails in user authentication within a predetermined period (for example, 3 minutes) becomes equal to or more than a predetermined number of times, the DS 1 generates a security warning in which an event that has occurred is recorded. Further, in a case where a specific remote user has not logged in to the DS 1 for a predetermined period of time or has changed the password, the DS 1 generates a security warning in which an event that has occurred is recorded. In addition, the security warning includes a user ID of a user who is the target of the recorded event.

In a case where the security warning is acquired from the DS 1, the CPU 21 of the image forming apparatus 2 displays the content of the security warning on the display unit 29 in a case where the user, who has been notified of the security warning, attempts to operate the image forming apparatus 2. Further, in a case where the security warning is acquired from the DS 1, the CPU 21 may transmit the content of the security warning to the email address included in the local user information 8B of the user who has been notified of the security warning.

On the other hand, the CPU 21 of the image forming apparatus 2 does not execute the synchronization process of the user information 8 shown in FIG. 11 with the local user information 8B of the user who has been notified of the security warning. In addition, in a case where the local user information 8B of the user who has been notified of the security warning is synchronized with the remote user information 8A of the user already associated with the local user information 8B and the same information is registered, the DS 1 may delete the data that is the target of the security warning from the remote user information 8A.

The resume of synchronization of the local user information 8B excluded from the targets to be synchronized with the DS 1 due to the security warning is instructed by the administrator, for example, in a case where the administrator of the service providing system 100 checks the situation and determines that there is no security problem. Alternatively, in a case where it is detected that the remote user information 8A has been re-registered, or after a predetermined period has elapsed for each warning content after the security warning is acquired, the CPU 21 may resume synchronization of the local user information 8B excluded from the targets to be synchronized with the DS 1 due to the security warning.

Update of User Information

As can be seen from the fact that the expiration date of the password is set in the remote authentication policy 7A shown in FIG. 3 and the local authentication policy 7B shown in FIG. 8, the user information 8 is updated by the user.

Hereinafter, the update process of the user information 8 executed in a case where the user updates the user information 8 will be described using an example in which the local user updates the local user information 8B.

Figure 12:
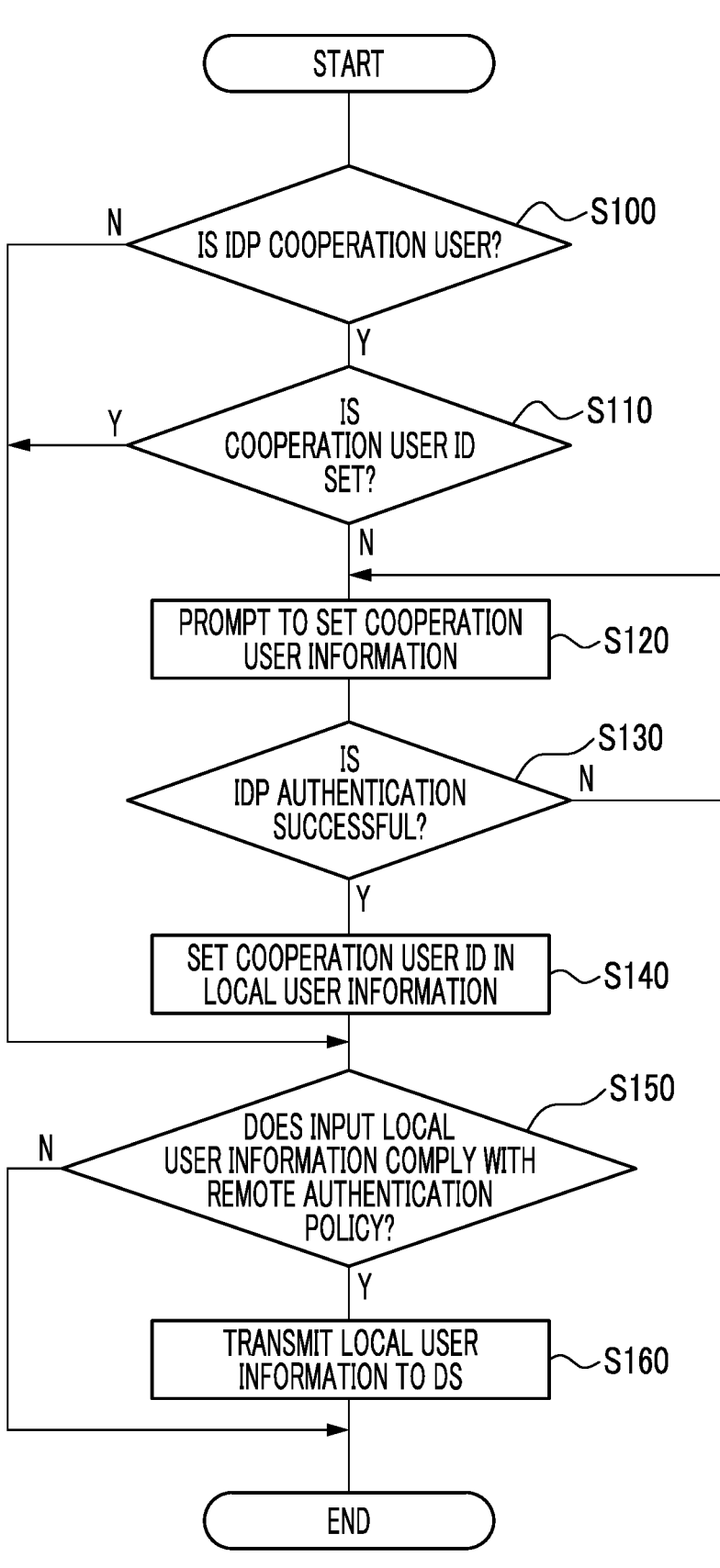
FIG. 12 is a flowchart showing an example of a flow of a user information update process.

FIG. 12 is a flowchart showing an example of a flow of an update process of the user information 8 executed by the CPU 21 of the image forming apparatus 2 in a case where a local user logs in to the image forming apparatus 2 and updates his/her own local user information 8B.

The local program that specifies the update process of the user information 8 is stored in advance, for example, in the non-volatile memory 24 of the image forming apparatus 2. The CPU 21 of the image forming apparatus 2 reads the local program stored in the non-volatile memory 24 and executes the update process of the user information 8.

First, in step S100, the CPU 21 determines whether or not the local user (hereinafter, referred to as "updated local user") who is trying to update the local user information 8B is an IDP cooperation user. The IDP cooperation user is a user who may use the service provided by the service providing system 100 by using IDP authentication. The CPU 21 refers to, for example, IDP cooperation user information, which records each IDP cooperation user, stored in advance in the non-volatile memory 24, and determines whether or not the updated local user is an IDP cooperation user. In a case where the updated local user is an IDP cooperation user, the process proceeds to step S110.

In step S110, the CPU 21 refers to the local user information 8B of the updated local user stored in the non-volatile memory 24, and determines whether or not the cooperation user ID is set. In a case where the cooperation user ID is not set, the process proceeds to step S120.

In this case, even though the updated local user is the IDP cooperation user, the cooperation user ID is not set in the local user information 8B of the updated local user. Therefore, in step S120, the CPU 21 displays, on the display unit 29, a message prompting the updated local user to set the cooperation user information used for IDP authentication in the IDP server 3. In addition, the CPU 21 may prompt the updated local user to set the cooperation user information by using voice, or a message and voice displayed on the display unit 29.

In a case where the updated local user sets the cooperation user information, the CPU 21 logs in to the IDP server 3 using the set cooperation user information, and causes the IDP server 3 to perform IDP authentication.

In step S130, the CPU 21 receives the response to the IDP authentication from the IDP server 3, and determines whether or not the IDP authentication is successful. In a case where the IDP authentication fails, for example, a reason that the password set as the cooperation user information does not comply with the authentication policy of the IDP server 3 is considered, the process proceeds to step S120 to prompt the updated local user to reset the cooperation user information. In a case where the IDP server 3 transmits a notification of the reason why the IDP authentication has failed, it is preferable that the CPU 21 also notify the updated local user of the reason why the IDP authentication has failed, in the case of prompting the resetting of the cooperation user information.

In a case where the IDP authentication is successful, the process proceeds to step S140. In step S140, the CPU 21 sets the cooperation user ID transmitted from the IDP server 3 in accordance with the success of the IDP authentication in the local user information 8B of the updated local user, and proceeds to step S150.

On the other hand, in a case where it is determined in the determination process of step S100 that the updated local user is not the IDP cooperation user, the cooperation user ID is unnecessary, so that the process proceeds to step S150 without executing the processes of steps S110 to S140.

Further, in a case where it is determined in the determination process of step S110 that the cooperation user ID is set in the local user information 8B of the updated local user, it is not necessary to prompt the updated local user to set the cooperation user information, so that the process proceeds to step S150 without executing the processes of steps S120 to S140.

In step S150, the CPU 21 determines whether or not the local user information 8B input by the updated local user complies with the local authentication policy 7B. In a case where the local user information 8B input by the updated local user does not comply with the local authentication policy 7B, the update process of the user information 8 shown in FIG. 12 is completed, and the CPU 21 displays, for example, a message prompting the updated local user to reinput the local user information 8B, on the display unit 29, and executes the update process of the user information 8 again.

On the other hand, in a case where the local user information 8B input by the updated local user complies with the local authentication policy 7B, the process proceeds to step S160.

In step S160, the CPU 21 transmits the updated local user information 8B to the DS 1, and updates the remote user information 8A associated with the updated local user in the DS 1 with the updated local user information 8B. As described above, the same user information 8 after the update is set in the DS 1 and the image forming apparatus 2, and the update process of the user information 8 shown in FIG. 12 is completed.

The update process of the user information 8 executed by the image forming apparatus 2 has been described with reference to FIG. 12. In a case where a remote user has updated the remote user information 8A included in the DS 1 by using the user terminal 4, the same process as the update process of the user information 8 shown in FIG. 12 is executed in the DS 1.

Therefore, by replacing the description regarding the synchronization process of the user information 8 and the description regarding the update process of the user information 8 shown above with the opposite terms in the DS 1 and the image forming apparatus 2, the synchronization process of the user information 8 executed by the CPU 11 of the DS 1 and the update process of the user information 8 executed by the CPU 11 of the DS 1 will be described.

Specifically, the description of the synchronization process of the user information 8 executed by the CPU 11 of the DS 1 and the update process of the user information 8 executed by the CPU 11 of the DS 1 is obtained by replacing, in the description of the synchronization process of the user information 8 and the description of the update process of the user information 8, "image forming apparatus 2" with "DS 1", "DS 1" with "image forming apparatus 2", "CPU 21" with "CPU 11", "non-volatile memory 24" with "non-volatile memory 14", "communication unit 27" with "communication unit 17", "input unit 28" with "input unit 18", "display unit 29" with "display unit 19", "local user" with "remote user", "remote user" with "local user", "local user information 8B" with "remote user information 8A", "remote user information 8A" with "local user information 8B", "local authentication policy 7B" with "remote authentication policy 7A", and "remote authentication policy 7A" with "local authentication policy 7B".

The remote program that specifies the synchronization process and the update process of the user information 8 is stored in advance in, for example, the non-volatile memory 14 of the DS 1. The CPU 11 of the DS 1 reads the remote program stored in the non-volatile memory 14, and executes the synchronization process of the user information 8 shown in FIG. 11 and the update process of the user information 8 shown in FIG. 12.

Although one aspect of the service providing system 100 has been described above using the exemplary embodiment, the disclosed mode of the service providing system 100 is an example, and the mode of the service providing system 100 is not limited to the scope described in the exemplary embodiment. Various modifications and improvements can be added to the exemplary embodiments without departing from the gist of the present disclosure, and the exemplary embodiments to which the modifications or improvements are added are also included in the technical scope of the present disclosure. For example, the internal processing order of processes such as the synchronization process of the user information 8 shown in FIG. 11 and the update process of the user information 8 shown in FIG. 12 may be changed without departing from the gist of the present disclosure.

Further, in the above-described exemplary embodiment, as an example, a mode in which each process shown in FIG. 11 and FIG. 12 is implemented by software has been described. However, the identical process as the flowchart of each process may be processed by hardware. In this case, the processing speed is increased as compared with the case where each process is implemented by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, an example in which the remote program is stored in the non-volatile memory 14 and the local program is stored in the non-volatile memory 24 has been described. However, the storage destinations of the respective programs are not limited to the non-volatile memory 14 and the non-volatile memory 24. The remote program of the present disclosure can also be provided in a form recorded on a storage medium readable by the computer 10. Further, the local program of the present disclosure can also be provided in a form recorded on a storage medium readable by the computer 20. For example, the remote program and the local program may be provided in a form recorded on an optical disk such as a Compact Disk Read Only Memory (CD-ROM) and a Digital Versatile Disk Read Only Memory (DVD-ROM). Further, the remote program and the local program may be provided in a form recorded in a portable semiconductor memory such as a Universal Serial Bus (USB) memory and a memory card. The ROMs 12 and 22, the non-volatile memories 14 and 24, the CD-ROM, the DVD-ROM, the USB, and the memory card are examples of non-transitory storage media.

Further, the DS 1 may download a remote program from an external apparatus (not shown) connected to the Internet 5A through the communication unit 17, and store the downloaded remote program in the storage device. Further, the image forming apparatus 2 may also download a local program from an external apparatus through the communication unit 27 and store the downloaded local program in the storage device.

In this case, the CPU 11 of the DS 1 reads the remote program downloaded from the external apparatus, from the storage device, and executes the synchronization process and the update process of the user information 8. Further, the CPU 21 of the image forming apparatus 2 reads the local program downloaded from the external apparatus, from the storage device, and executes the synchronization process and the update process of the user information 8.

Supplementary notes according to the present exemplary embodiment are shown below.

(((1)))

An information processing apparatus comprising:

a processor configured to:

acquire specified information that specifies a rule of first authentication information for each user used for authentication of the user, from a remote apparatus connected by a communication line via a firewall; and synchronize the first authentication information and second authentication information stored in the remote apparatus, by transmitting the first authentication information compliant with the specified information among the first authentication information to the remote apparatus.

(((2)))

The information processing apparatus according to (((1))), wherein the processor is configured to:

even in a case where the first authentication information does not comply with the specified information, as long as the first authentication information satisfies a predetermined specific condition, transmit the first authentication information that does not comply with the specified information to the remote apparatus.

(((3)))

The information processing apparatus according to (((2))), wherein the processor is configured to:

transmit, to the remote apparatus, a deletion instruction for causing the remote apparatus to delete the second authentication information corresponding to the first authentication information that does not comply with the specified information and does not satisfy the specific condition, among the first authentication information.

(((4)))

The information processing apparatus according to (((2))) or (((3))), wherein the specific condition is a condition that the first authentication information is associated with third authentication information issued by an authentication apparatus installed outside the firewall.

(((5)))

The information processing apparatus according to any one of (((1))) to (((4))), wherein the processor is configured to:

even in a case where the first authentication information complies with the specified information, as long as a user associated with the first authentication information satisfies a predetermined specific condition, not transmit the first authentication information that complies with the specified information to the remote apparatus.

(((6)))

The information processing apparatus according to (((5))), wherein the specific condition is defined using at least one of a predetermined condition regarding an affiliation destination of the user, a predetermined condition regarding a position of the user, or a predetermined condition regarding a frequency of use of functions provided by the information processing apparatus.

(((7)))

A service providing system comprising:

a local apparatus that includes a first processor, is connected by a communication line to a remote apparatus via a firewall, and is installed inside the firewall; and the remote apparatus that includes a second processor and is installed outside the firewall, wherein the first processor is configured to:

acquire, from the remote apparatus, specified information that specifies a rule of authentication information used for authenticating a user; and transmit a first authentication information compliant with the acquired authentication information, among the first authentication information used by the local apparatus for authenticating the user, to the remote apparatus, and the second processor is configured to:

perform a synchronization process between the first authentication information received from the remote apparatus and second authentication information associated with the first authentication information and stored in the remote apparatus.

(((8)))

The service providing system according to (((7))), wherein the first processor is configured to:

even in a case where the first authentication information does not comply with the specified information, as long as the first authentication information satisfies a predetermined specific condition, transmit the first authentication information that does not comply with the specified information to the remote apparatus.

(((9)))

The service providing system according to (((8))), wherein the first processor is configured to:

transmit, to the remote apparatus, the first authentication information that does not comply with the specified information and does not satisfy the specific condition, among the first authentication information, and the second processor is configured to:

delete the second authentication information corresponding to the first authentication information, in a case of receiving the first authentication information that does not comply with the specified information and does not satisfy the specific condition, from the local apparatus.

(((10)))

The service providing system according to (((8))) or (((9))), wherein the specific condition is a condition that the first authentication information is associated with third authentication information issued by an authentication apparatus installed outside the firewall.

(((11)))

The service providing system according to any one of (((7))) to (((10))), wherein the first processor is configured to:

even in a case where the first authentication information complies with the specified information, as long as a user associated with the first authentication information satisfies a predetermined specific condition, not transmit the first authentication information that complies with the specified information to the remote apparatus.

(((12)))

The service providing system according to (((11))), wherein the specific condition is defined using at least one of a predetermined condition regarding an affiliation destination of the user, a predetermined condition regarding a position of the user, or a predetermined condition regarding a frequency of use of functions provided by the local apparatus.

(((13)))

A non-transitory computer readable medium storing a program that is to be executed by a computer installed inside a firewall so as to execute a synchronization process of user information, wherein the synchronization process including:

acquiring specified information that specifies a rule of first authentication information for each user used for authentication of the user, from a remote apparatus connected by a communication line via the firewall; and transmitting, to the remote apparatus, the first authentication information that complies with the specified information, among the first authentication information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a storage device configured to store at least first authentication information for authenticating users of the information processing apparatus; and a processor configured to:

acquire, from a remote apparatus connected by a communication line via a firewall, second authentication information for authenticating the users at the remote apparatus and specified information that specifies a rule for authentication of the users at the remote apparatus not located within the firewall in which the information processing apparatus is located;

synchronize the first authentication information and second authentication information stored in the remote apparatus, by transmitting a part of the first authentication information compliant with the specified information among the first authentication information to the remote apparatus, wherein the first authentication information and the second authentication information are different; and for a remaining part of the first authentication information which does not comply with the specified information, as long as the remaining part of the first authentication information satisfies a specific condition which is predetermined, transmit also the remaining part of the first authentication information that does not comply with the specified information to the remote apparatus.

2. The information processing apparatus according to claim 1, wherein the processor is configured to:

transmit, to the remote apparatus, a deletion instruction for causing the remote apparatus to delete the second authentication information corresponding to the remaining part of the first authentication information that does not comply with the specified information and does not satisfy the specific condition, among the first authentication information.

3. The information processing apparatus according to claim 1, wherein the specific condition is a condition that the first authentication information is associated with third authentication information issued by an authentication apparatus installed outside the firewall.

4. The information processing apparatus according to claim 2, wherein the specific condition is a condition that the first authentication information is associated with third authentication information issued by an authentication apparatus installed outside the firewall.

5. The information processing apparatus according to claim 1, wherein the processor is configured to:

even in a case where the part of the first authentication information complies with the specified information, as long as a user associated with the first authentication information satisfies a predetermined specific condition, not transmit the first authentication information that complies with the specified information to the remote apparatus.

6. The information processing apparatus according to claim 5, wherein the specific condition is defined using at least one of a predetermined condition regarding an affiliation destination of the user, a predetermined condition regarding a position of the user, or a predetermined condition regarding a frequency of use of functions provided by the information processing apparatus.

7. A service providing system comprising:

a local apparatus that includes a first processor which is connected by a communication line to a remote apparatus via a firewall and is installed inside the firewall; and the remote apparatus that includes a second processor and is installed outside the firewall, wherein the first processor is configured to:

acquire, from the remote apparatus connected by the communication line via the firewall, second authentication information for authenticating the users at the remote apparatus and specified information that specifies a rule for authentication of the users at the remote apparatus;

synchronize the first authentication information and second authentication information stored in the remote apparatus, by transmitting a part of the first authentication information compliant with the specified information among the first authentication information to the remote apparatus, wherein the first authentication information and the second authentication information are different; and for a remaining part of the first authentication information which does not comply with the specified information, as long as the remaining part of the first authentication information satisfies a specific condition which is predetermined, transmit also the remaining part of the first authentication information that does not comply with the specified information to the remote apparatus.

8. The service providing system according to claim 7, wherein the first processor is configured to:

transmit, to the remote apparatus, the remaining part of the first authentication information that does not comply with the specified information and does not satisfy the specific condition, among the first authentication information, and the second processor is configured to:

delete the second authentication information corresponding to the first authentication information, in a case of receiving the remaining part of the first authentication information that does not comply with the specified information and does not satisfy the specific condition, from the local apparatus.

9. The service providing system according to claim 7, wherein the specific condition is a condition that the first authentication information is associated with third authentication information issued by an authentication apparatus installed outside the firewall.

10. The service providing system according to claim 8, wherein the specific condition is a condition that the first authentication information is associated with third authentication information issued by an authentication apparatus installed outside the firewall.

11. The service providing system according to claim 7, wherein the first processor is configured to:

even in a case where the remaining part of the first authentication information complies with the specified information, as long as a user associated with the first authentication information satisfies a predetermined specific condition, not transmit the remaining part of the first authentication information that complies with the specified information to the remote apparatus.

12. The service providing system according to claim 11, wherein the specific condition is defined using at least one of a predetermined condition regarding an affiliation destination of the user, a predetermined condition regarding a position of the user, or a predetermined condition regarding a frequency of use of functions provided by the local apparatus.

13. An information processing apparatus comprising:

means for storing at least first authentication information for authenticating users of the information processing apparatus;

means for acquiring, from a remote apparatus connected by a communication line via a firewall, second authentication information for authenticating the users at the remote apparatus and specified information that specifies a rule for authentication of the users at the remote apparatus not located within the firewall in which the information processing apparatus is located;

means for synchronizing the first authentication information and second authentication information stored in the remote apparatus, by transmitting a part of the first authentication information compliant with the specified information among the first authentication information to the remote apparatus, wherein the first authentication information and the second authentication information are different; and means for transmitting, for a remaining part of the first authentication information which does not comply with the specified information, as long as the remaining part of the first authentication information satisfies a specific condition which is predetermined, also the remaining part of the first authentication information that does not comply with the specified information to the remote apparatus.

\* \* \* \* \*